(12) United States Patent
Hirano

(10) Patent No.: US 10,926,514 B2
(45) Date of Patent: Feb. 23, 2021

(54) SOLDER CONNECTION STRUCTURE AND FILM FORMING METHOD

(71) Applicant: TATSUTA ELECTRIC WIRE & CABLE CO., LTD., Higashiosaka (JP)

(72) Inventor: Masaki Hirano, Kizugawa (JP)

(73) Assignee: TATSUTA ELECTRIC WIRE & CABLE CO., LTD., Osaka (JP)

( * ) Notice: Subject to any disclaimer, the term of this patent is extended or adjusted under 35 U.S.C. 154(b) by 198 days.

(21) Appl. No.: 16/061,390

(22) PCT Filed: Dec. 22, 2016

(86) PCT No.: PCT/JP2016/088310
§ 371 (c)(1),
(2) Date: Jun. 12, 2018

(87) PCT Pub. No.: WO2017/110985
PCT Pub. Date: Jun. 29, 2017

(65) Prior Publication Data
US 2018/0361708 A1    Dec. 20, 2018

(30) Foreign Application Priority Data
Dec. 24, 2015   (JP) .................................. 2015-252077

(51) Int. Cl.
*B32B 15/01*   (2006.01)
*C23C 24/04*   (2006.01)
*C23C 28/02*   (2006.01)

(52) U.S. Cl.
CPC ............ *B32B 15/017* (2013.01); *C23C 24/04* (2013.01); *C23C 28/021* (2013.01); *C23C 28/023* (2013.01)

(58) Field of Classification Search
None
See application file for complete search history.

(56) References Cited

U.S. PATENT DOCUMENTS

2001/0016267 A1   8/2001   Huhn et al.
2006/0258055 A1   11/2006  Okamoto
(Continued)

FOREIGN PATENT DOCUMENTS

EA   200970855 A1   4/2010
JP   S55-45505 A    3/1980
(Continued)

OTHER PUBLICATIONS

International Search Report dated Feb. 7, 2017.
(Continued)

*Primary Examiner* — Xiaobei Wang
(74) *Attorney, Agent, or Firm* — Harness, Dickey & Pierce, P.L.C.

(57) ABSTRACT

Provided are (i) a solder connection structure having improved solder wettability and including an aluminum base material and (ii) a film forming method for forming, on the aluminum base material, a metal film having high solder wettability. A solder connection structure (50) includes (i) an aluminum substrate (30), (ii) an Ni film (35) formed on the aluminum substrate by a cold spray method, and (iii) a mixed metal film (40) provided on the Ni film, the mixed metal film (40) being formed by the cold spray method with use of a mixed powder material, the mixed powder material being a mixture of Ni powder (41) and Sn powder (42).

3 Claims, 10 Drawing Sheets

(56) References Cited

U.S. PATENT DOCUMENTS

| | | |
|---|---|---|
| 2010/0041228 A1 | 2/2010 | Okamoto |
| 2010/0206529 A1 | 8/2010 | Ogilvy et al. |
| 2011/0244262 A1 | 10/2011 | Sato et al. |
| 2014/0030634 A1 | 1/2014 | Nanbu et al. |

FOREIGN PATENT DOCUMENTS

| | | | |
|---|---|---|---|
| JP | 2001-164379 A | | 6/2001 |
| JP | 2002-254195 A | | 9/2002 |
| JP | 2006-68765 A | | 3/2006 |
| JP | 2006-319146 A | | 11/2006 |
| JP | 2011-29323 A | | 2/2011 |
| JP | 2011-212684 A | | 10/2011 |
| JP | 2012-003877 A | | 1/2012 |
| JP | 2012-094595 A | | 5/2012 |
| JP | 2013-125952 A | | 6/2013 |
| JP | 2013-236030 | * | 11/2013 |
| JP | 2014-072398 A | | 4/2014 |
| JP | 2015-137384 A | | 7/2015 |
| RU | 2549783 C2 | | 4/2015 |
| WO | WO-2013/168666 A1 | | 11/2013 |

OTHER PUBLICATIONS

International Preliminary Report on Patentability dated Jun. 26, 2018.
Extended European Search Report dated Apr. 4, 2019.
Office Action for U.S. Appl. No. 15/571,057 dated May 31, 2019.
Office Action for U.S. Appl. No. 15/571,057 dated Nov. 29, 2019.
Office Action for U.S. Appl. No. 15/571,057 dated Apr. 8, 2020.
Office Action for Taiwanese Patent Application No. 105114604 dated May 11, 2018 and English translation thereof.
Office Action for U.S. Appl. No. 15/571,057 dated Mar. 25, 2019.
Office Action for U.S. Appl. No. 15/571,057 dated Mar. 6, 2020.
International Search Report dated Jul. 12, 2016.
International Preliminary Report on Patentability dated Nov. 21, 2017.
Japanese Office Action and English translation thereof dated Oct. 23, 2018.
European Search Report dated Oct. 22, 2018.
Office Action for Russian Patent Application No. 2017144086 dated Sep. 30, 2019 and English translation thereof.
Li. et al. "Characterization and solderability of cold sprayed Sn—Cu coatings on Al and Cu substrates". Surf Coat Technol, vol. 204, Issues 9-10, Jan. 25, 2010, pp. 1395-1404. (Year: 2010).
Office Action for U.S. Appl. No. 15/571,057 dated Oct. 1, 2020.
Advisory Action for U.S. Appl. No. 15/571,057 dated Dec. 3, 2020.

* cited by examiner

SOLDER CONNECTION STRUCTURE AND FILM FORMING METHOD

TECHNICAL FIELD

The present invention relates to (i) a solder connection structure to be connected with a member via a solder material and (ii) a film forming method for forming a metal film on a substrate.

BACKGROUND ART

It is being demanded in recent years that an electrical component be, for example, smaller, lighter, higher in performance, and more reliable. Examples of the electrical component include an electric power source, a cell, a circuit board, a connector, and the like. Generally, cold spray, a screw, soldering, welding, or the like is used to connect such an electrical component to a substrate, a terminal, or the like.

Patent Literature 1 discloses the following arrangement. Specifically, metal layers each of which is made of an electrically conductive metal that is easily soldered are provided at regular intervals on a part of a surface of a belt-shaped flat conductor that is made of aluminum or an aluminum alloy. Then, an insulative resin film is attached to either side of the flat conductor between the respective metal layers. The electrically conductive metal can be any of Ni, Sn, Au, Zn, Ag, and Cu, or a combination thereof. The metal layer is formed by cold spray or the like.

CITATION LIST

Patent Literature

[Patent Literature 1]
Japanese Patent Application Publication, Tokukai, No. 2012-3877 (Publication Date: Jan. 5, 2012)

SUMMARY OF INVENTION

Technical Problem

According to the technique disclosed in Patent Literature 1, an Ni film is formed, by a cold spray method, on the surface of the belt-shaped flat conductor that is made of aluminum or an aluminum alloy. Note, however, that the Ni film formed by the cold spray method has a low surface density, and has insufficient solder wettability, accordingly.

In view of the problems, the present invention has an object to provide (i) a solder connection structure having improved solder wettability and including an aluminum base material and (ii) a film forming method for forming, on the aluminum base material, a metal film having high solder wettability.

Solution to Problem

In order to attain the object, a solder connection structure in accordance with an embodiment of the present invention is a solder connection structure to be connected with a member via a solder material, including (i) an aluminum base material, (ii) a nickel (Ni) film provided on the aluminum base material, the nickel (Ni) film being formed by a cold spray method, and (iii) a mixed metal film provided on the nickel (Ni) film, the mixed metal film being formed by the cold spray method with use of a mixed powder material, the mixed powder material being a mixture of (i) a first powder material that contains any of nickel (Ni), gold (Au), zinc (Zn), silver (Ag), and copper (Cu), or an alloy of two or more kinds thereof and (ii) a second powder material that contains tin (Sn) or an Sn-containing alloy.

In order to attain the object, a film forming method in accordance with an embodiment of the present invention is a film forming method for forming a metal film on an aluminum base material, including (i) a first film formation step of forming, on the aluminum base material, a nickel (Ni) film by a cold spray method and (ii) a second film formation step of forming, on the nickel (Ni) film, a mixed metal film by the cold spray method with use of a mixed powder material, which is a mixture of (i) a first powder material that contains any of nickel (Ni), gold (Au), zinc (Zn), silver (Ag), and copper (Cu), or an alloy of two or more kinds thereof and (ii) a second powder material that contains tin (Sn) or an Sn-containing alloy.

According to the solder connection structure above and the film forming method above, the mixed metal film is provided on the aluminum base material. The mixed metal film is formed with use of a mixed powder material which is a mixture of the first powder material and the second powder material. Note here that the second powder material contains a substance which, when cold sprayed, is more likely to be in a semi-molten state than the substance(s) contained in the first powder material. Accordingly, the second powder material in the semi-molten state enters a space between respective particles constituting the first powder material, so as to carry out a function of coupling the particles. Furthermore, since the particles constituting the first powder material are covered with the second powder material which is in the semi-molten state, generation of the oxide which lowers solder wettability is less likely to occur.

As such, according to the solder connection structure in accordance with an embodiment of the present invention and the film forming method in accordance with an embodiment of the present invention, it is possible to improve solder wettability as compared with a solder connection structure in which only an Ni film is provided on an aluminum base material.

Further, in an embodiment of the present invention, the solder connection structure is preferably configured such that a total film thickness of the nickel (Ni) film and the mixed metal film is more than 10 μm and not more than 30 μm.

The above configuration allows increasing a tensile strength of the solder connection structure in accordance with an embodiment of the present invention.

Further, in an embodiment of the present invention, the solder connection structure is preferably configured such that the mixed powder material contains the first powder material in a weight ratio of not less than 80% and not more than 95%.

The above configuration allows further enhancing solder wettability of the solder connection structure in accordance with an embodiment of the present invention.

Advantageous Effects of Invention

According to one aspect of the present invention, it is possible to improve solder wettability of a solder connection structure which includes an aluminum base material.

DESCRIPTION OF EMBODIMENTS

Embodiments are described below with reference to the drawings. In the following description, identical components and identical constituent elements are given respective identical reference signs. Such components and constituent elements are also identical in name and function. Thus, a specific description of those components and constituent elements is not repeated.

[Cold Spray]

In recent years, a film forming method that is called a cold spray method has been used. The cold spray method is a method for (i) causing a carrier gas whose temperature is lower than a melting point or a softening temperature of metallic powder, of which a metal film is to be made, to flow at a high speed, (ii) introducing the metallic powder into the flow of the carrier gas and then increasing the speed of the carrier gas into which the metallic powder has been introduced, and (iii) forming the metal film by causing the metallic powder to collide with, for example, a substrate at a high speed while the metallic powder is in a solid phase.

A principle of film formation by the cold spray method is understood as below.

A collision speed of not less than a certain critical value is required for metallic powder to adhere to and accumulate on a substrate so as to form a film. Such a collision speed is referred to as a critical speed. In a case where the metallic powder collides with the substrate at a speed that is less than the critical speed, the substrate is worn, so that small crater-shaped cavities are merely formed in the substrate. The critical speed is changed by, for example, a material, a size, a shape, a temperature, and/or an oxygen content of the metallic powder, and/or a material of the substrate.

In a case where the metallic powder collides with the substrate at a speed that is not less than the critical speed, plastic deformation caused by a great shear occurs near an interface between the metallic powder and the substrate (or the film which has already been formed). The plastic deformation and generation of a great shock wave in a solid due to the collision cause an increase in temperature near the interface, and in this process, solid phase bonding occurs between the metallic powder and the substrate and between the metallic powder and the film (or the metallic powder which has already adhered to the substrate).

EMBODIMENTS

A cold spray device 100 in accordance with an embodiment of the present invention is described below with reference to FIG. 1.

(Cold Spray Device 100)

Figure 1:
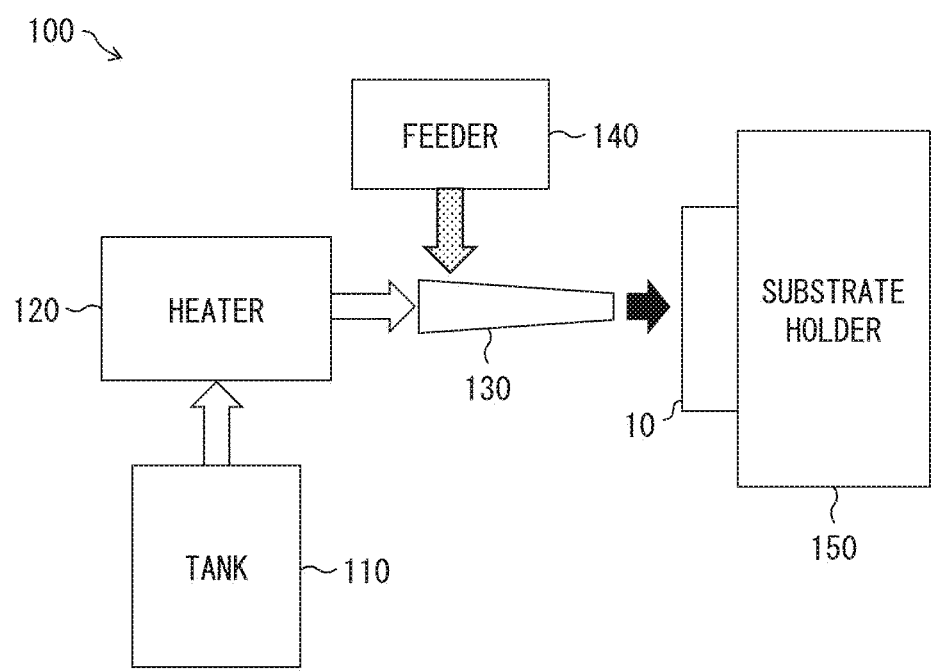
FIG. 1 is a view schematically illustrating a cold spray device.

FIG. 1 is a view schematically illustrating the cold spray device 100. As illustrated in FIG. 1, the cold spray device 100 includes a tank 110, a heater 120, a nozzle 130, a feeder 140, a base material holder 150, and a control device (not illustrated).

The tank 110 stores therein a carrier gas. The carrier gas is supplied from the tank 110 to the heater 120. Examples of the carrier gas include nitrogen, helium, air, or a mixed gas of nitrogen, helium, and air. A pressure of the carrier gas is adjusted so that the pressure is, for example, not less than 70 PSI and not more than 150 PSI (not less than approximately 0.48 Mpa and not more than approximately 1.03 Mpa) at an exit of the tank 110. Note, however, that the pressure of the carrier gas at the exit of the tank 110 does not necessarily need to fall within the above range, and is appropriately adjusted in accordance with, for example, material(s) and/or a size of metallic powder, or material(s) of a substrate.

The heater 120 heats the carrier gas which has been supplied from the tank 110. More specifically, the carrier gas is heated to a temperature that is lower than a melting point of the metallic powder which is supplied from the feeder 140 to the nozzle 130. For example, the carrier gas which is subjected to measurement at an exit of the heater 120 is heated to a temperature in a range of not less than 50° C. and not more than 500° C. Note, however, that a heating temperature of the carrier gas does not necessarily need to fall within the above range, and is appropriately adjusted in accordance with, for example, the material(s) and/or the size of the metallic powder, or the material(s) of the substrate.

The carrier gas is heated by the heater 120 and then is supplied to the nozzle 130.

The nozzle 130 (i) causes an increase in speed of the carrier gas which has been heated by the heater 120 to a speed in a range of not less than 300 m/s and not more than 1200 m/s and (ii) causes the carrier gas to be sprayed therethrough onto a base material 10. Note, however, that the speed of the carrier gas does not necessarily need to fall within the above range, and is appropriately adjusted in accordance with, for example, the material(s) and/or the size of the metallic powder, or the material(s) of the substrate.

The feeder 140 supplies the metallic powder to the flow of the carrier gas whose speed is increased by the nozzle 130. The metallic powder which is supplied from the feeder 140 has a particle size of, for example, not less than 1 μm and not more than 50 μm. Together with the carrier gas, the metallic powder which has been supplied from the feeder 140 is sprayed through the nozzle 130 onto the base material 10.

The base material holder 150 fixes the base material 10. Onto the base material 10 which has been fixed by the base material holder 150, the carrier gas and the metallic powder are sprayed through the nozzle 130. A distance between a surface of the base material 10 and a tip of the nozzle 130 is adjusted so that the distance falls within a range of, for example, not less than 5 mm and not more than 30 mm. Note, however, that the distance between the surface of the base material 10 and the tip of the nozzle 130 does not necessarily need to fall within the above range, and is appropriately adjusted in accordance with, for example, the material(s) and/or the size of the metallic powder, or the material(s) of the substrate.

The control device controls the cold spray device 100 in accordance with information stored therein in advance and/or an input by an operator. Specifically, the control device controls, for example, (1) the pressure of the carrier gas which is supplied from the tank 110 to the heater 120, (2) the temperature of the carrier gas which is heated by the heater 120, (3) a kind and an amount of the metallic powder which is supplied from the feeder 140, and (4) the distance between the surface of the base material 10 and the nozzle 130.

(Formation of Ni Film 35 and Mixed Metal Film 40)

Figure 2:
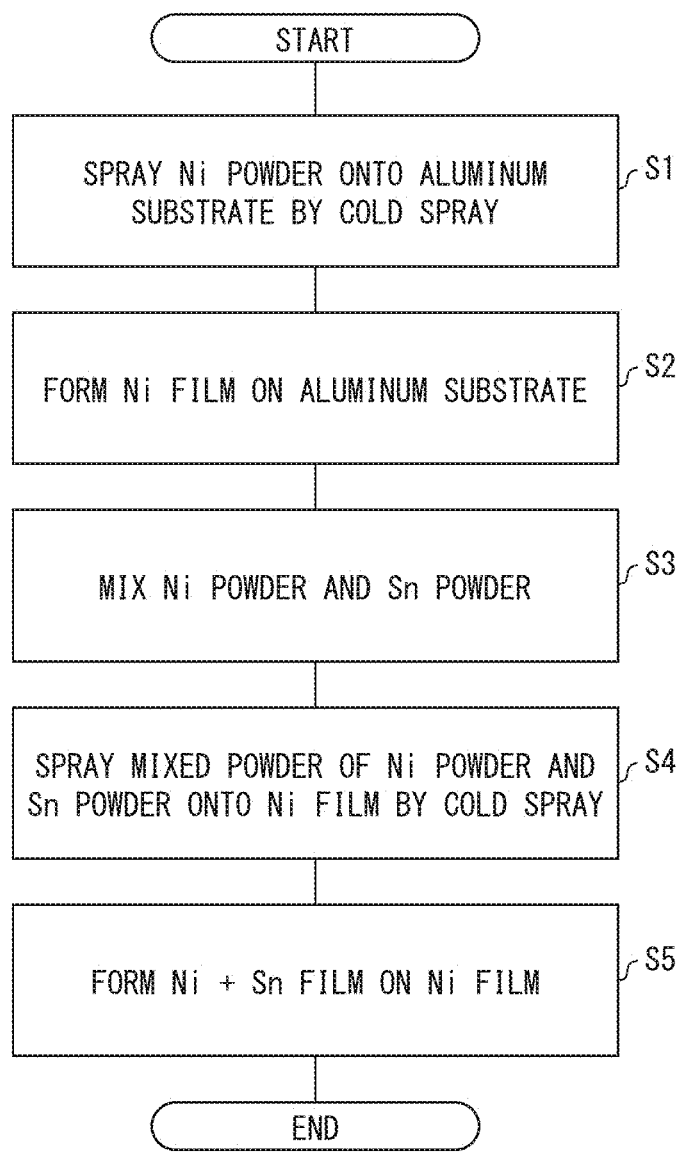
FIG. 2 is a flowchart of a film forming method in accordance with an embodiment of the present invention.
Figure 3:
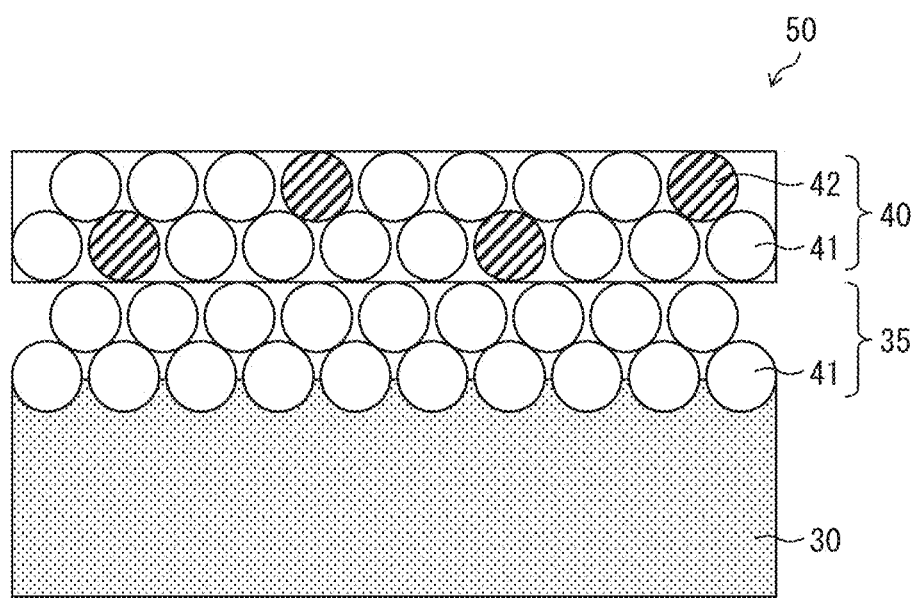
FIG. 3 is a view schematically illustrating a solder connection structure in accordance with an embodiment of the present invention.

With reference to FIGS. 2 and 3, the following description discusses, for example, a method in which the cold spray method is used to form an Ni film 35 on an aluminum substrate 30 and further form a mixed metal film 40 on the Ni film 35. FIG. 2 is a flowchart of a film forming method in accordance with an embodiment of the present invention. FIG. 3 is a view schematically illustrating a solder connection structure 50 in accordance with an embodiment of the present invention.

Firstly, with reference to FIG. 3, the following description discusses the solder connection structure 50.

The solder connection structure 50 includes the aluminum substrate 30, the Ni film 35 which is provided on the aluminum substrate 30, and the mixed metal film 40 which is provided on the Ni film 35.

The Ni film 35 is formed by the cold spray method so as to spray the Ni powder 41 onto the aluminum substrate 30. The mixed metal film 40 is formed by the cold spray method so as to spray, onto the Ni film 35, a mixed powder material which is a mixture of the Ni powder 41 (a first powder material) and Sn powder 42 (a second powder material). Note that the first powder material can contain any of Ni, gold (Au), zing (Zn), silver (Ag), and copper (Cu), or an alloy of two or more kinds thereof. The second powder material can contain Sn or an Sn-containing alloy. For easy explanation, the following description assumes that the mixed metal film 40 is made of a mixed powder material which is a mixture of the Ni powder 41 and the Sn powder 42 in FIGS. 2 and 3.

Sn has a melting point (231.97° C.) which is lower than a melting point (1453° C.) of Ni. Thus, the Sn powder 42 which is cold sprayed is highly likely to be in a molten state (or a semi-molten state). Accordingly, when the mixed powder material is cold sprayed, Sn in the semi-molten state enters a space between respective Ni particles so as to carry out a function of coupling the Ni particles. Further, the function of Sn allows the mixed metal film 40 to have a surface that has fewer irregularities.

The following description discusses each step in the flowchart shown in FIG. 2. First, the Ni powder 41 is sprayed onto the aluminum substrate 30 by the cold spray method (S1, a first film formation step). As a result, the Ni film 35 is formed on the aluminum substrate 30 (S2, the first film formation step). Next, the Ni powder 41 and the Sn powder 42 are mixed together (S3). Then, a mixed powder material, which is a mixture of the Ni powder 41 and the Sn powder 42, is sprayed onto the Ni film 35 by the cold spray method (S4, a second film formation step). As a result, the mixed metal film 40 (Ni+Sn film) is formed on the Ni film 35 (S5, the second film formation step).

Example 1

The following description discusses Example 1 in accordance with an embodiment of the present invention. In Example 1, the solder connection structure illustrated in FIG. 3 is formed under the following conditions.

In Example 1, the aluminum substrate 30 illustrated in FIG. 3 corresponds to the base material 10 illustrated in FIG. 1. The aluminum substrate 30 is a plate material made of aluminum, is rectangular, and has a thickness of 0.5 mm.

In Example 1, the Ni film 35 is formed with use of the Ni powder 41. The Ni powder 41 has an average particle size of approximately 10 μm. The Ni powder 41 is sprayed through the nozzle 130 onto the aluminum substrate 30, so that the Ni film 35 is formed on the aluminum substrate 30.

The metal film 40 is formed with use of the mixed powder material, which is a mixture of the Ni powder 41 and the Sn powder 42. The Ni powder 41 has an average particle size of approximately 10 μm, and the Sn powder 42 has an average particle size of approximately 38 μm. The Ni powder 41 and the Sn powder 42 are mixed together in an Ni to Sn weight ratio of 95:5. The mixed powder material is sprayed through the nozzle 130 onto the aluminum substrate 30, so that the mixed metal film 40 is formed on the Ni film 35.

A distance between the tip of the nozzle 130 and the aluminum substrate 30 is 12 mm.

From the tank 110, air is supplied as the carrier gas. The pressure of the carrier gas is set at 150 PSI (approximately 1.03 Mpa) at the exit of the tank 110. The heater 120 has a preset temperature of 250° C., and the carrier gas which contacts the Ni powder and the Sn powder has a temperature that is lower than the melting point (231.97° C.) of Sn.

The Ni powder 41 which is sprayed through the nozzle 130 onto the aluminum substrate 30 reaches the aluminum substrate 30 at a temperature of approximately 103° C. The mixed powder material which is sprayed through the nozzle 130 onto the Ni film 35 reaches the Ni film 35 at a temperature of approximately 103° C.

The solder connection structure 50 illustrated in FIG. 3 is thus formed under the above conditions.

Comparative Example 1

The following description discusses a solder connection structure in accordance with Comparative Example 1, to be compared with Example 1. The solder connection structure in accordance with Comparative Example 1 includes an aluminum substrate and an Ni film which is formed on the aluminum substrate with use of a cold spray device 100. The Ni film consists of an aggregate of Ni particles, and a gap is made between the respective Ni particles. Thus, the Ni film has many irregularities on a surface thereof.

In the solder connection structure in accordance with Comparative Example 1, the aluminum substrate is a plate material made of aluminum, is rectangular, and has a thickness of 0.5 mm. The Ni powder has an average particle size of approximately 10 μm and is sprayed through a nozzle 130 onto the aluminum substrate.

A distance between a tip of the nozzle 130 and the aluminum substrate is 12 mm.

From a tank 110, air is supplied as a carrier gas. The pressure of the carrier gas is set at 150 PSI (approximately 1.03 Mpa) at an exit of the tank 110. A heater 120 has a preset temperature of 250° C., and the carrier gas which contacts the Ni powder has a temperature that is lower than the melting point (1453° C.) of Ni.

(Evaluation of Wettability by Sn Bath)

The following description discusses a wettability evaluation test conducted on the solder connection structure 50 in accordance with Example 1 and the solder connection structure in accordance with Comparative Example 1.

The wettability evaluation test is carried out as below. Specifically, in view of the fact that many of solder materials are Sn-based metals, a film-formed surface to which flux for removing an oxide film is applied is immersed, for 5 seconds, in a crucible in which Sn is melted. Note here that the "film-formed surface" refers to a surface of each of the solder connection structures on which surface the mixed metal film 40 (Example 1) or the Ni film (Comparative Example 1) is formed by cold spray.

Figure 4:
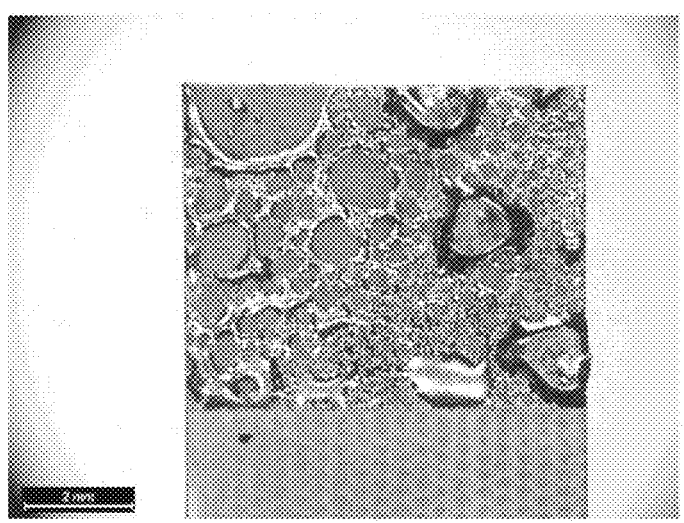
FIG. 4 is a photograph showing a state of a solder connection structure in accordance with Comparative Example 1 which solder connection structure has been immersed in an Sn bath for 5 seconds.
Figure 5:
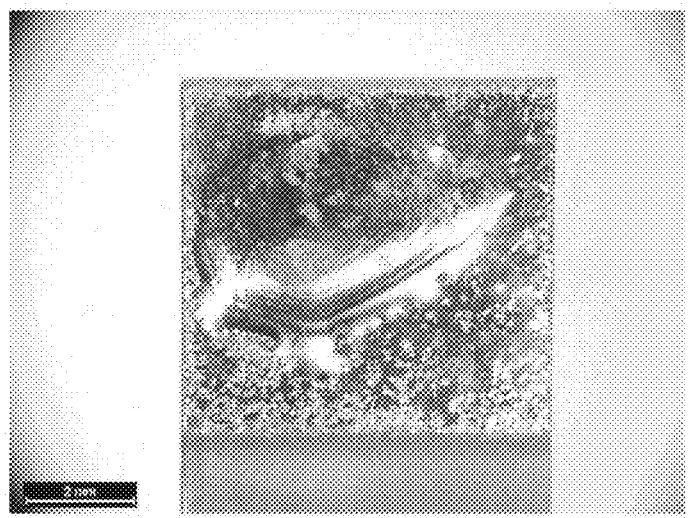
FIG. 5 is a photograph showing a state of a solder connection structure in accordance with an embodiment of the present invention which solder connection structure has been immersed in an Sn bath for 5 seconds (an Ni to Sn weight ratio=95:5).

The following description discusses results of the wettability evaluation test with reference to FIGS. 4 and 5. FIG. 4 is a photograph showing a state of the solder connection structure (the Ni film alone) in accordance with Comparative Example 1 which solder connection structure has been immersed in the Sn bath for 5 seconds. FIG. 5 is a photograph showing a state of the solder connection structure 50 (the Ni film 35+the mixed metal film 40) in accordance with Example 1 which solder connection structure 50 has been immersed in the Sn bath for 5 seconds.

First, a result obtained in Comparative Example 1 is described. In a case where the solder connection structure in accordance with Comparative Example 1 is immersed in the Sn bath for 5 seconds, a plurality of places where the Ni film, to which no Sn adheres, is exposed is found in the solder connection structure (see FIG. 4). This is because of the following point.

According to the cold spray method, a metal film is formed by causing metallic particles to collide with a substrate at a high speed while the metallic particles are in a solid phase. Thus, according to the solder connection structure in accordance with Comparative Example 1, an aggregate of particles of the Ni powder is placed on the aluminum substrate in a direction in which the Ni powder is sprayed. Meanwhile, in a direction perpendicular to the direction in which the Ni powder is sprayed, a gap or a recess is easily made between the respective particles of the Ni powder, so that the Ni film has many irregularities on a surface thereof. Thus, for, for example, (1) the reason that Ni has a lower surface density and (2) the reason that the Ni film is influenced by an oxide generated on the Ni film, the solder connection structure in accordance with Comparative Example 1 has lower solder wettability as shown by observation of FIG. 4.

Meanwhile, as described earlier with reference to FIGS. 2 and 3, the solder connection structure 50 in accordance with Example 1 includes the aluminum substrate 30, the Ni film 35 provided on the aluminum substrate 30, and the mixed metal film 40 provided on the Ni film 35. The Ni film 35 is a metal film which is formed on the aluminum substrate 30 through cold spray of the Ni powder 41. The mixed metal film 40 is a metal film which is formed on the Ni film 35 through cold spray of the mixed powder material which is a mixture of the Ni powder 41 and the Sn powder 42.

Note here that Sn is lower in melting point than Ni. Thus, the Sn powder 42 which is cold sprayed is highly likely to be in a semi-molten state. Sn in the semi-molten state enters a space between respective Ni particles so as to carry out a function of coupling the Ni particles.

FIG. 5 shows a result obtained in a case where the solder connection structure 50 is immersed in the Sn bath for 5 seconds. In the solder connection structure 50 which is observed after being immersed in the Sn bath for 5 seconds, few places where the Ni film 35 is exposed are found. This reveals that the solder connection structure 50 has higher solder wettability than the solder connection structure in accordance with Comparative Example 1.

(Remark 1)

The following is the reason why the solder connection structure above is employed as Comparative Example 1.

A solder connection structure in which Ni powder is cold sprayed onto an aluminum substrate is a conventional technique. Note, however, that the inventor of the present invention found (a) that the solder connection structure in accordance with Comparative Example 1 has unfavorable solder wettability and (b) that a reason for the above (a) seems to be that (i) Ni has a reduced surface density and (ii), accordingly, the Ni film is influenced by an oxide generated on the Ni film. In order to verify the above (a) and (b), the inventor of the present invention employed the solder connection structure in accordance with Comparative Example 1 to be used as a comparison.

(Remark 2)

The above-described wettability evaluation test by the Sn bath is not in conformity with "JIS C60068-2-54•JIS Z3198-4" in which a solder checker for evaluating wettability of each of molten solder and an electronic component is used. This is because evaluation of solder wettability by appearance observation is also highly reliable.

(Mixing Ratio Between Ni Powder and Sn Powder)

The following description discusses an influence of a mixing ratio between the Ni powder 41 and the Sn powder 42 on solder wettability at the time of formation of the mixed metal film 40.

In Example 1, the Ni powder 41 and the Sn powder 42 are mixed together in an Ni to Sn weight ratio of 95:5 in the mixed metal film 40. In light of this, evaluation was made of solder wettability obtained in a case where the mixing ratio between the Ni powder 41 and the Sn powder 42 in the mixed metal film 40 is changed to respective Ni to Sn weight ratios of the following five cases.

(Case 1) Ni:Sn=95:5
(Case 2) Ni:Sn=90:10
(Case 3) Ni:Sn=80:20
(Case 4) Ni:Sn=60:40
(Case 5) Ni:Sn=98:2

According to evaluation of solder wettability obtained through each of the changes to the respective five cases above, it is confirmed that satisfactory solder wettability is obtained in Case 1 (Ni to Sn weight ratio=95:5), Case 2 (Ni to Sn weight ratio=90:10), and Case 3 (Ni to Sn weight ratio=80:20). Note, however, that lower solder wettability is obtained in Case 4 (Ni to Sn weight ratio=60:40) and also in Case 5 (Ni to Sn weight ratio=98:2). It is found from the results obtained above that Ni power and Sn powder which are mixed in a mixing ratio falling within a predetermined range enhances solder wettability. The reason for this is described below.

As described earlier, according to the cold spray method, a metal film is formed by causing metallic particles to collide with a substrate at a high speed while the metallic particles are in a solid phase. Thus, according to the solder connection structure in accordance with Comparative Example 1, an aggregate of particles of the Ni powder is placed on the aluminum substrate in a direction in which the Ni powder is sprayed. Meanwhile, in a direction perpendicular to the direction in which the Ni powder is sprayed, a gap or a recess is easily made between the respective particles of the Ni powder, so that the Ni film has many irregularities on a surface thereof. Thus, according to the solder connection structure in accordance with Comparative Example 1, (1) Ni has a lower surface density and, (2) the Ni film becomes more likely to be influenced by an oxide generated on the Ni film. In a case where the solder connection structure thus arranged is immersed in the Sn bath for 5 seconds, an Sn film is less likely to adhere to the surface of the Ni film, and a part of the Ni film is exposed.

For the above reasons, the solder connection structure in accordance with Comparative Example 1 has lower solder wettability. Same applies to the solder connection structure corresponding to Case 5 where the Ni powder 41 is contained in the mixed powder material of the Ni powder 41 and the Sn powder 42 in a high weight ratio.

The following description explains that lower solder wettability is obtained in the solder connection structure corresponding to Case 4. As described above, the melting point of Sn is 231.97° C., which is close to a preset temperature of the carrier gas. Thus, the Sn powder 42 which is cold sprayed is highly likely to be in a semi-molten state. Sn in the semi-molten state enters a space between respective Ni particles so as to carry out a function of coupling the Ni particles. This allows the metal film 40 to be a continuous film that has fewer irregularities. Further, since the Ni particles are covered with Sn which is in the semi-molten state, generation of the oxide which lowers solder wettability is prevented.

Note, however, that since the Sn particles account for a high percentage (40%) of the mixed powder material, in a case where the solder connection structure corresponding to Case 4 is immersed in the Sn bath for 5 seconds, a part of Sn contained in the mixed metal film 40 is melted in the Sn bath, so that a part of the Ni film, which is a layer under the Sn film, is exposed. As a result, the solder connection structure corresponding to Case 4 has lower solder wettability.

For the above reasons, the solder connection structures corresponding to Cases 4 and 5 each have low solder wettability.

Meanwhile, in each of the solder connection structures 50 corresponding to Cases 1, 2, and 3, the Ni powder 41 accounts for a high percentage of the mixed powder material, so that the mixed metal film 40 has a high Ni density. This allows reducing a proportion of Sn which is melted in the Sn bath among the Sn contained in the mixed metal film 40, in a case where the solder connection structures corresponding to Cases 1, 2, and 3 are each immersed in the Sn bath for 5 seconds. As a result, the solder connection structures 50 corresponding to Cases 1, 2, and 3 each have higher solder wettability.

Furthermore, since the Ni powder 41 is covered with the Sn film, generation of the oxide which lowers solder wettability is prevented. It seems that for this reason, too, enhancement of solder wettability is achieved in each of the solder connection structures 50 corresponding to Cases 1, 2, and 3.

For the above reasons, in a case of forming the mixed metal film 40 on the Ni film 35 with use of the mixed powder material which is a mixture of the Ni powder 41 and the Sn powder 42, it is preferable that the mixed powder material contain the Ni powder in a weight ratio of not less than 80% and not more than 95%. In a case where the weight ratio of the Ni powder contained in the mixed powder material falls within the above range, the solder connection structure 50 can have enhanced solder wettability.

(Tensile Strength of Solder Connection Structure)

As described above, the solder connection structure 50 in accordance with an embodiment of the present invention has enhanced solder wettability. Note, however, that even if the solder connection structure 50 has enhanced solder wettability, the solder connection structure 50 is not suitable for practical use in a case where a tensile strength between a base material, to which the solder connection structure 50 is soldered, and the solder connection structure 50 is low. In light of this, the following description studies the tensile strength of the solder connection structure 50.

Note that in the following description, "tensile strength" refers to an amount of force required in order to peel off a Cu material from a solder connection structure to which the Cu material is joined with a joining area of 7 mm×10 mm=70 mm². In other words, to calculate a general tensile strength, i.e., an amount of force per unit area, a tensile strength herein should be divided by 70 mm².

It should be noted in advance that a decrease in tensile strength of a solder connection structure is caused by, for example, a gap (hereinafter referred to as "void") created inside the solder connection structure.

The following description makes a comparison between a solder connection structure in accordance with Comparative Example 2 and the solder connection structure 50 in accordance with Example 1, so as to study a tensile strength between a base material, to which the solder connection structure 50 is soldered, and the solder connection structure 50.

Note that, as described below, the solder connection structure in accordance with Comparative Example 2 is a solder connection structure in which only a mixed metal film is provided on an aluminum substrate. SEM (Scanning Electron Microscope) photographs shown in the drawings to be used in the following description have each been obtained with use of JSM-6510LA manufactured by JEOL Ltd.

Comparative Example 2

The following description discusses the solder connection structure in accordance with Comparative Example 2 to be compared with Example 1. The solder connection structure in accordance with Comparative Example 2 includes the aluminum substrate and the mixed metal film. The mixed metal film is a mixed film made of a mixed powder material which is a mixture of Ni powder and Sn powder. The mixed metal film is formed directly on the aluminum substrate by cold spray.

In the solder connection structure in accordance with Comparative Example 2, the aluminum substrate is a plate material made of aluminum, is rectangular, and has a thickness of 0.5 mm. The Ni powder has an average particle size of approximately 10 µm, and the Sn powder has an average particle size of approximately 38 µm. The Ni powder 41 and the Sn powder 42 are mixed together in an Ni to Sn weight ratio of 95:5. The mixed powder material is sprayed through a nozzle 130 onto the aluminum substrate 30.

A distance between a tip of the nozzle 130 and the aluminum substrate 30 is 12 mm.

From a tank 110, air is supplied as a carrier gas. A pressure of the carrier gas is set at 150 PSI (approximately 1.03 Mpa) at an exit of the tank 110. A heater 120 has a preset temperature of 250° C., and the carrier gas which contacts the Ni powder 41 and the Sn powder 42 has a temperature that is lower than the melting point (231.97° C.) of Sn.

(Condition 1: 230° C. for 10 Seconds)

Figure 6:
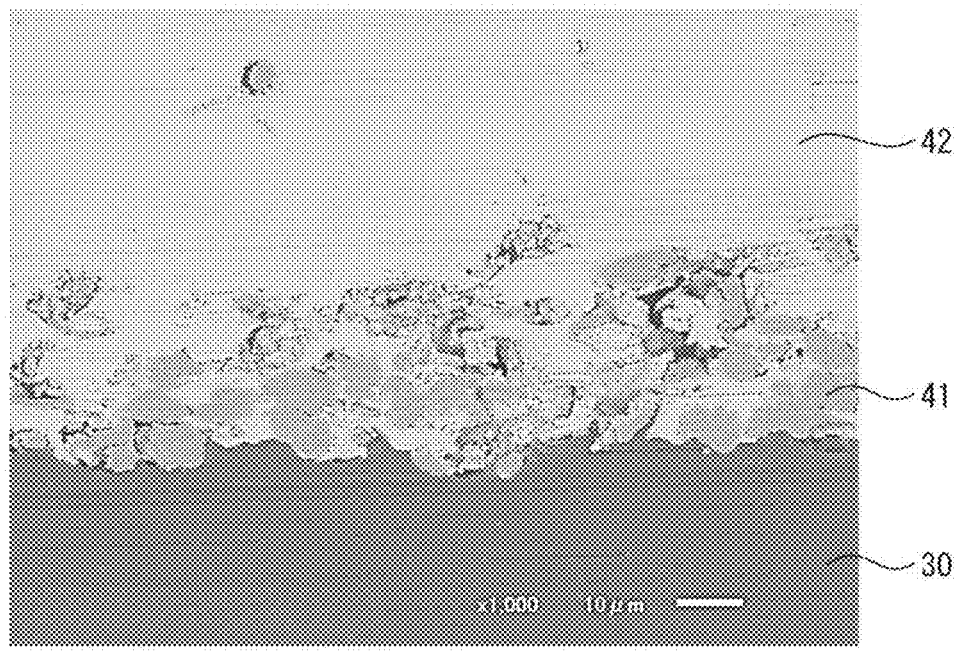
FIG. 6 is an SEM photograph showing, at a magnification of 1000 times, a cross-section of a solder connection structure in accordance with Comparative Example 2 which solder connection structure has been subjected to soldering at 230° C. for 10 seconds.

FIG. 6 is an SEM photograph showing, at a magnification of 1000 times, a cross-section of the solder connection structure in accordance with Comparative Example 2 which solder connection structure has been subjected to soldering at 230° C. for 10 seconds. Sn—Ag—Cu solder (lead-free solder) was used in the soldering as a solder material.

The temperature (230° C.) for soldering is lower than the melting point (231.97° C.) of Sn. Thus, although a part of Sn particles contained in the solder connection structure in accordance with Comparative Example 2 may become semi-molten, the Sn particles do not completely melt. Accordingly, no significant void has been created in the solder connection structure in accordance with Comparative Example 2 under Condition 1 (see FIG. 6).

However, an average value of a tensile strength between a Cu material, which was soldered to the solder connection structure, and the aluminum substrate as averaged from results of five times of measurement conducted in accordance with "JIS Z3198-5: Methods for tensile tests and sheer tests on solder joints" was 34.9 N. This value is lower than each of a tensile strength of the solder connection structure (the Ni film 35+the mixed metal film 40) in accordance with Example 1 and a tensile strength of the solder connection structure (the Ni film alone) in accordance with Comparative Example 1 (described later). A cause of this seems to be that minute voids, if not large, were created through the soldering and these minute voids caused a decrease in tensile strength.

(Condition 2: 270° C. for 10 Seconds)

Figure 7:
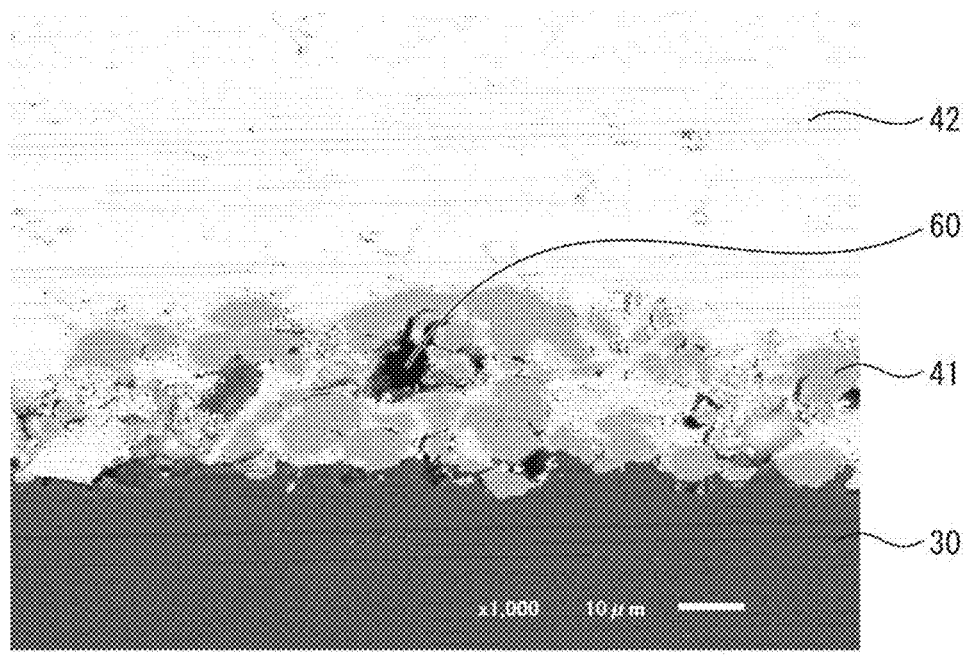
FIG. 7 is an SEM photograph showing, at a magnification of 1000 times, a cross-section of the solder connection structure in accordance with Comparative Example 2 which solder connection structure has been subjected to soldering at 270° C. for 10 seconds.

The following description discusses, with reference to FIG. 7, a case in which the solder connection structure (the mixed metal film alone) in accordance with Comparative Example 2 was subjected to soldering at 270° C. for 10 seconds. FIG. 7 is an SEM photograph showing, at a magnification of 1000 times, a cross-section of the solder connection structure in accordance with Comparative Example 2 which solder connection structure has been subjected to soldering at 270° C. for 10 seconds.

Since the temperature (270° C.) for soldering is higher than the melting point (231.97° C.) of Sn, Sn particles contained in the solder connection structure in accordance with Comparative Example 2 become melted. Thus, in the solder connection structure in accordance with Comparative Example 2 under Condition 2, Sn contained in the mixed metal film was melted near an interface between the aluminum substrate and the mixed metal film, so that a large void 60 was created inside the mixed metal film (see FIG. 7).

An average value of a tensile strength between a Cu material, which was soldered to the solder connection structure above, and the aluminum substrate as averaged from results of five times of measurement conducted in accordance with "JIS Z3198-5: Methods for tensile tests and sheer tests on solder joints", was 12.0 N. Due to the creation of the large void 60 inside the solder connection structure in accordance with Comparative Example 2 as a result of the melting of Sn, an area of a connection portion between the aluminum substrate and the mixed metal film decreased (see FIG. 7). This seems to have caused a decrease in tensile strength between the Cu material, which was soldered to the solder connection structure in accordance with Comparative Example 2, and the aluminum substrate, so that the value as low as 12.0 N was obtained.

(Condition 3: 270° C. for 5 Seconds)

With respect to the solder connection structure (the mixed metal film alone) in accordance with Comparative Example 2, a tensile strength between a Cu material, which was soldered to the solder connection structure, and the aluminum substrate was measured in accordance with "JIS Z3198-5: Methods for tensile tests and sheer tests on solder joints" under a condition of 270° C. for 5 seconds. The measurement was conducted for five times to yield respective results as follows: 7.79 N, 21.74 N, 21.91 N, 28.18 N, and 11.69 N. An average value was 18.3 N.

Under Condition 3, too, creation of a void seems to have played a role in causing a decrease in tensile strength between the Cu material, which was soldered to the solder connection structure, and the aluminum substrate, as with Condition 2.

(Solder Connection Structure 50 in Accordance with Example 1)

Figure 8:
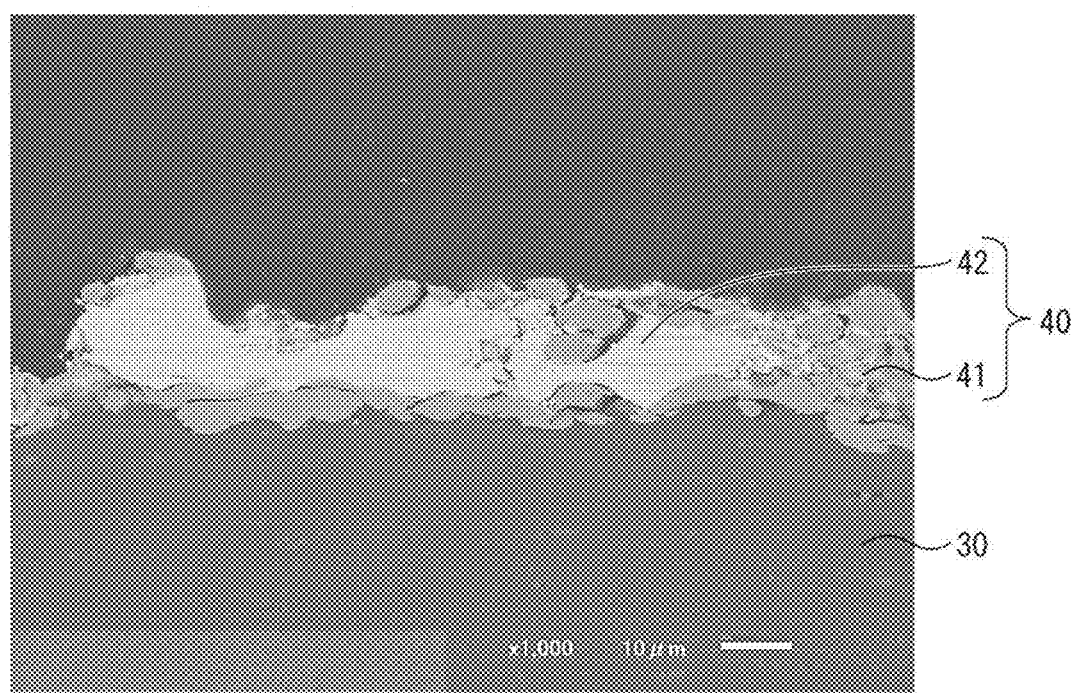
FIG. 8 is an SEM photograph showing, at a magnification of 1000 times, a cross-section of a solder connection structure in accordance with an embodiment of the present invention.
Figure 9:
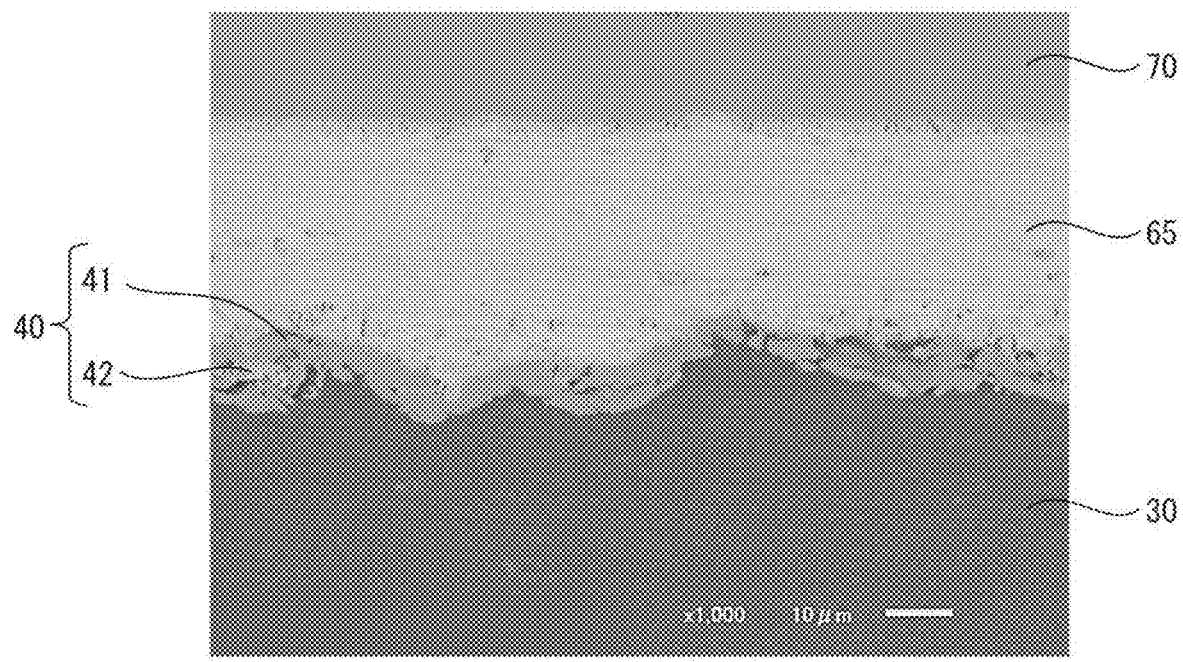
FIG. 9 is an SEM photograph showing, at a magnification of 1000 times, a cross-section of a solder connection structure in accordance with an embodiment of the present invention which solder connection structure has been subjected to soldering at 270° C. for 15 seconds.

The following description discusses, with reference to FIGS. 8 and 9, a tensile strength of the solder connection structure 50 in accordance with Example 1. FIG. 8 is an SEM photograph showing, at a magnification of 1000 times, a cross-section of the solder connection structure 50 (the Ni film 35+the mixed metal film 40) in accordance with Example 1.

(Condition 4: 270° C. for 15 Seconds)

FIG. 9 is an SEM photograph showing, at a magnification of 1000 times, a cross-section of the solder connection structure 50 (the Ni film 35+the mixed metal film 40) which has been subjected to soldering at 270° C. for 15 seconds. The solder connection structure 50 is connected with a Cu material 70 via a solder material 65.

Under the above condition, too, creation of a void was not observed in the solder connection structure 50 after the soldering (see FIG. 9). Further, an average value of a tensile strength between the Cu 70 material soldered to the solder connection structure 50 and the aluminum substrate 30 as averaged from results of five times of measurement conducted in accordance with "JIS Z3198-5: Methods for tensile tests and sheer tests on solder joints" was as high as 82.0 N. A reason for this seems to be as follows.

In the solder connection structure 50, the Ni film 35 is provided on the aluminum substrate 30, and the mixed metal film 40 is provided on the Ni film 35 (see FIG. 8). Accordingly, the Sn particles contained in the mixed metal film 40 do not directly contact the aluminum substrate 30. Thus, it is possible in the solder connection structure 50 (the Ni film 35+the mixed metal film 40) to prevent an increase in temperature of the Sn particles. This seems to have enabled the solder connection structure 50 (the Ni film 35+the mixed metal film 40) to achieve (i) prevention of creation of a void which causes a decrease in tensile strength and (ii) a resultant increase in tensile strength.

(Conclusion)

As described above, the solder connection structure (the mixed metal film alone) in accordance with Comparative Example 2 has a lower tensile strength between a Cu material, which is soldered to the solder connection structure, and the aluminum substrate. Meanwhile, the solder connection structure 50 (the Ni film 35+the mixed metal film 40) in accordance with an embodiment of the present invention has high solder wettability and, furthermore, a higher tensile strength between a Cu material, which is soldered to the solder connection structure, and the aluminum substrate. Thus, the solder connection structure 50 in accordance with an embodiment of the present invention can be considered to be a solder connection structure that is more suitable for practical use.

For reference, the following description additionally discusses the solder connection structure (the Ni film alone) in accordance with Comparative Example 1.

The solder connection structure (the Ni film alone) in accordance with Comparative Example 1 was subjected to soldering at 270° C. for 10 seconds. An average value of a tensile strength between a Cu material, which was soldered to the solder connection structure, and the aluminum substrate as averaged from results of five times of measurement conducted was 70.1 N. Thus, the solder connection structure (the Ni film alone) in accordance with Comparative Example 1 can be deemed to have durability from a viewpoint of tensile strength alone. However, as described above, the solder connection structure (the Ni film alone) in accordance with Comparative Example 1 is inferior to the solder connection structure 50 (the Ni film 35+the mixed metal film 40) in accordance with an embodiment of the present invention in terms of wettability.

(Structure in Which Solder Connection Structure 50 and Cu Material 70 Have Been Soldered Together)

Figure 10:
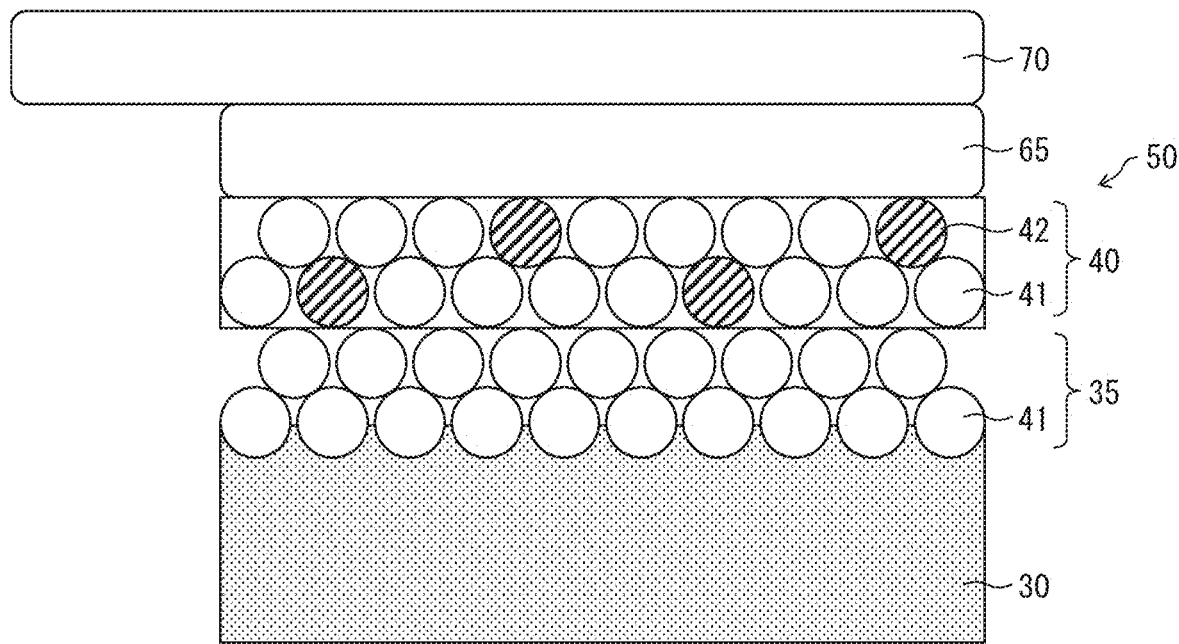
FIG. 10 is a view schematically illustrating a structure in which a solder connection structure in accordance with an embodiment of the present invention and a Cu material have been soldered together.

The following description discusses, with reference to FIG. 10, a structure in which the solder connection structure 50 and the Cu material 70 have been soldered together. FIG. 10 is a view schematically illustrating a structure in which the solder connection structure 50 and the Cu material 70 have been soldered together.

In FIG. 10, the Cu material 70 is a member which is connected with the mixed metal film 40 of the solder connection structure 50 via the solder material 65.

The solder material 65 is not limited to a specific kind, and can be, for example, eutectic solder, high melting point solder, high temperature solder, low melting point solder, silver-containing solder, lead-containing solder, lead-free solder, or the like.

The Cu material 70 can be, for example, a Cu plate, a copper wire, or the like. Alternatively, the Cu material 70 is not limited to a copper member, and can be a metal (including an alloy) of another kind, an electric circuit, a substrate, a terminal, or the like.

Figure 11:
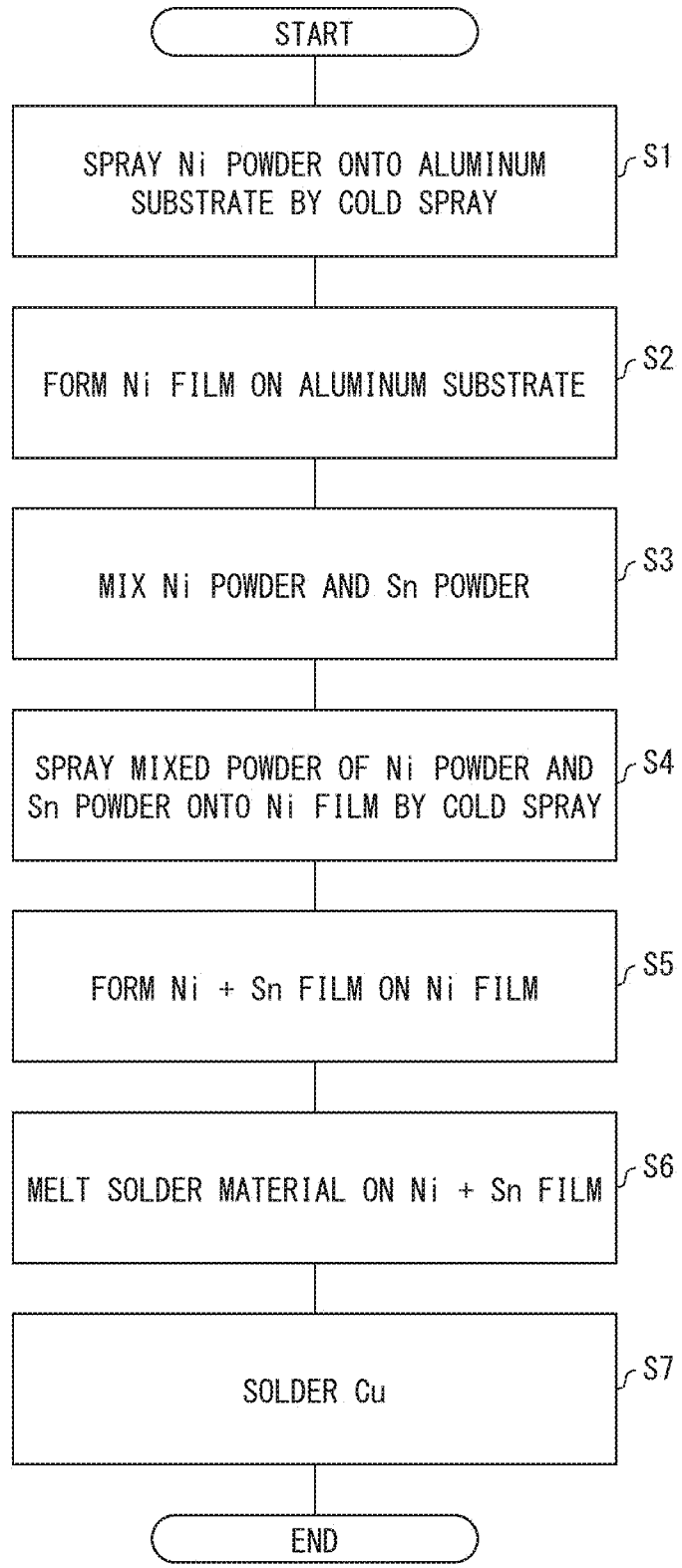
FIG. 11 is a flowchart of a method for connecting a Cu material with an aluminum substrate.

FIG. 11 is a flowchart of a method for connecting the Cu material 70 with the aluminum substrate 30. In FIG. 11, descriptions of steps S1 through S5 are not repeated since the steps S1 through S5 have already been described with reference to FIG. 2. On the mixed metal film 40 which has been formed through the step S5, the solder material 65 is melted (S6). Then, the Cu material 70 is soldered via the solder material 65 melted (S7). Through the above procedure, a structure in which the solder connection structure 50 and the Cu material 70 have been soldered together is obtained.

With the solder connection structure 50 (the Ni film 35+the mixed metal film 40), soldering at a temperature higher than the melting point (231.97° C.) of Sn does not cause a void as easily as in a conventional solder connection structure. Further, since Sn enters a space between respective Ni particles, A surface of the metal film 40 has fewer irregularities. This brings about another effect that the structure in which the solder connection structure 50 and the Cu material 70 have been soldered together has a reduced electric resistance.

(Relation Between Film Thickness of Mixed Metal Film 40 and Tensile Strength)

Figure 12:
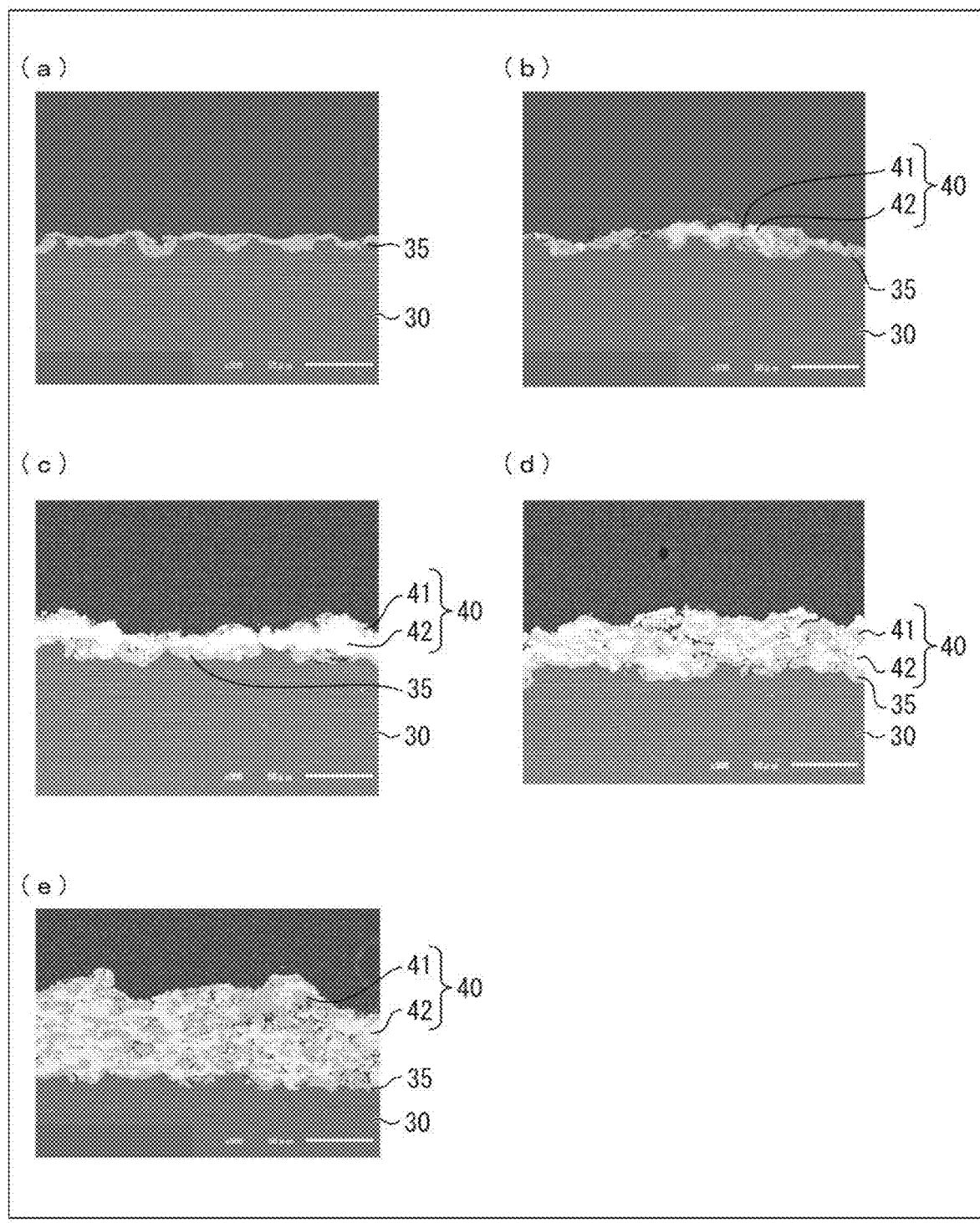
FIG. 12 shows SEM photographs each captured at a magnification of 500 times. (a) of FIG. 12 shows a cross-section of the solder connection structure in accordance with Comparative Example 1. (b) of FIG. 12 shows a cross-section of a solder connection structure in which a total film thickness is approximately 15 µm. (c) of FIG. 12 shows a cross-section of a solder connection structure in which the total film thickness is approximately 20 µm. (d) of FIG. 12 shows a cross-section of a solder connection structure in which the total film thickness is approximately 40 µm. (e) of FIG. 12 shows a cross-section of a solder connection structure in which the total film thickness is approximately 80 µm.
Figure 13:
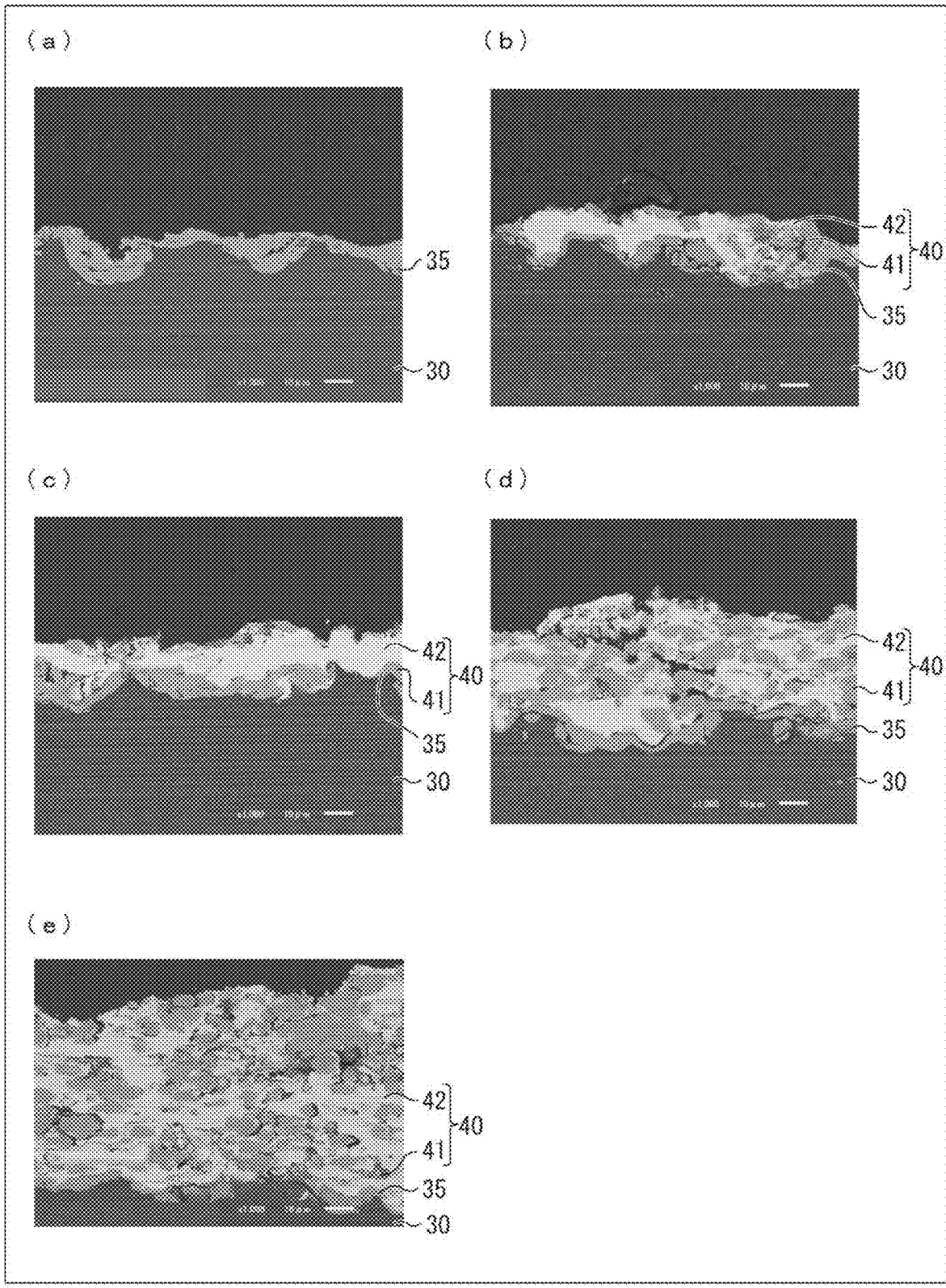
FIG. 13 shows SEM photographs each captured at a magnification of 1000 times. (a) of FIG. 13 shows a cross-section of the solder connection structure in accordance with Comparative Example 1. (b) of FIG. 13 shows a cross-section of a solder connection structure in which a total film thickness is approximately 15 µm. (c) of FIG. 13 shows a cross-section of a solder connection structure in which the total film thickness is approximately 20 µm. (d) of FIG. 13 shows a cross-section of a solder connection structure in which the total film thickness is approximately 40 µm. (e) of FIG. 13 shows a cross-section of a solder connection structure in which the total film thickness is approximately 80 µm.
Figure 14:
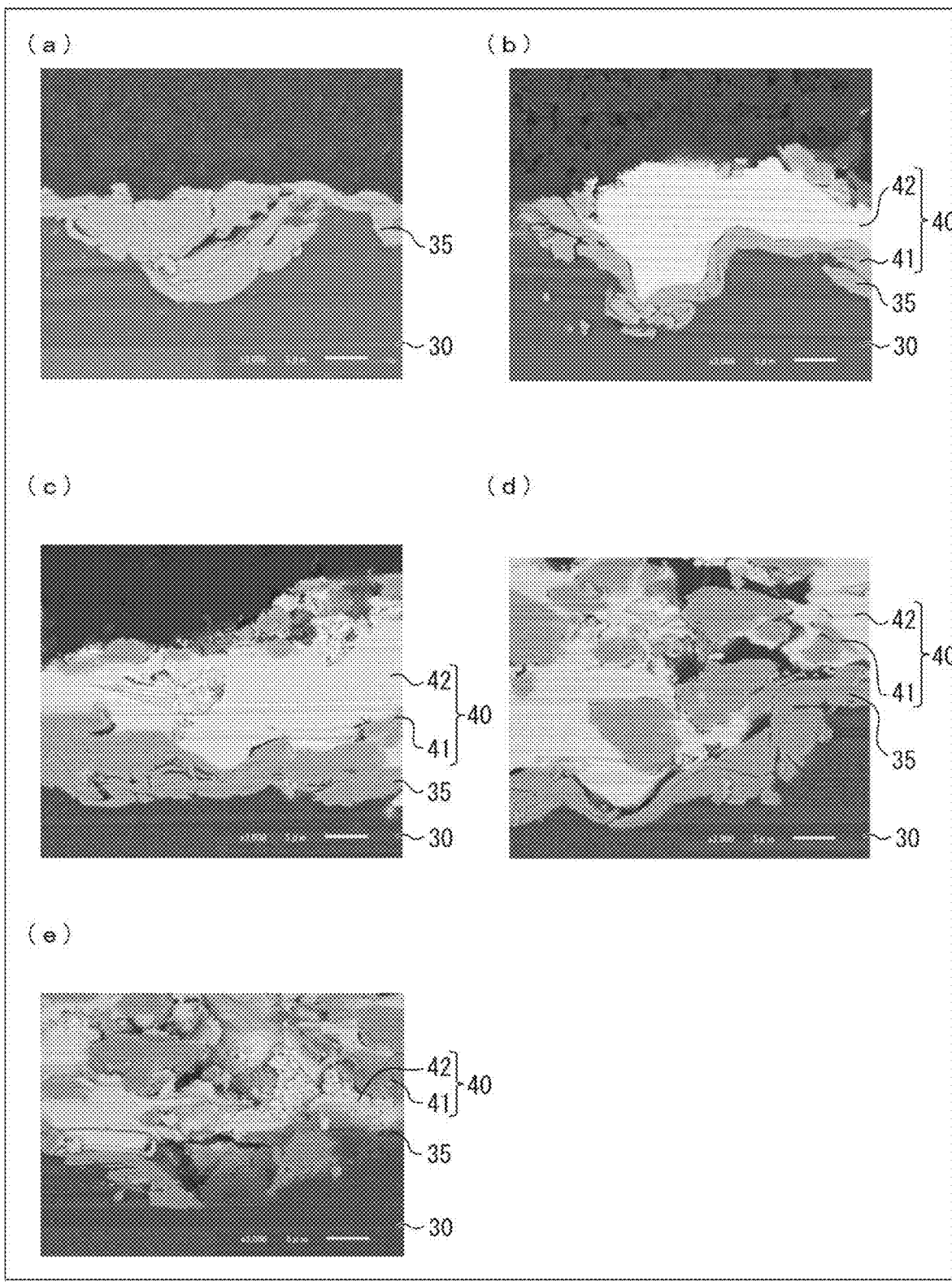
FIG. 14 shows SEM photographs each captured at a magnification of 1000 times. (a) of FIG. 14 shows a cross-section of the solder connection structure in accordance with Comparative Example 1. (b) of FIG. 14 shows a cross-section of a solder connection structure in which a total film thickness is approximately 15 µm. (c) of FIG. 14 shows a cross-section of a solder connection structure in which the total film thickness is approximately 20 µm. (d) of FIG. 14 shows a cross-section of a solder connection structure in which the total film thickness is approximately 40 µm. (e) of FIG. 14 shows a cross-section of a solder connection structure in which the total film thickness is approximately 80 µm.

The following description discusses, with reference to FIGS. 12 through 14, a relation between (i) a film thickness of the mixed metal film 40 in the solder connection structure 50 (the Ni film 35+the mixed metal film 40) in accordance with an embodiment of the present invention and (ii) a tensile strength of the solder connection structure 50. Hereinafter, a sum of a thickness of the Ni film 35 and a thickness of the mixed metal film 40 will be referred to as "total film thickness". The Ni film 35 has been formed to have a thickness of approximately 10 μm in each example shown in FIGS. 12 through 14. SEM photographs shown in respective FIGS. 12 through 14 have been captured at a magnification of 500 times, 1000 times, and 3000 times, respectively (for the sake of visibility, multiple photographs which have been captured with varying magnifications are provided).

(a) of FIG. 12 is a view showing an SEM photograph of a cross-section of the solder connection structure (the Ni film alone) in accordance with Comparative Example 1. In (a) of FIG. 12, the total film thickness is approximately 10 μm. (b) of FIG. 12 is a view showing an SEM photograph of a cross-section of a solder connection structure 50 (the Ni film 35+the mixed metal film 40) in which the total film thickness is approximately 15 μm. (c) of FIG. 12 is a view showing an SEM photograph of a cross-section of a solder connection structure 50 in which the total film thickness is approximately 20 µm. (d) of FIG. 12 is a view showing an SEM photograph of a cross-section of a solder connection structure 50 in which the total film thickness is approximately 40 µm. (e) of FIG. 12 is a view showing an SEM photograph of a cross-section of a solder connection structure 50 in which the total film thickness is approximately 80 µm.

(a) of FIG. 13 is a view showing an SEM photograph of a cross-section of the solder connection structure (the Ni film alone) in accordance with Comparative Example 1. (b) of FIG. 13 is a view showing an SEM photograph of a cross-section of the solder connection structure 50 (the Ni film 35+the mixed metal film 40) in which the total film thickness is approximately 15 µm. (c) of FIG. 13 is a view showing an SEM photograph of a cross-section of the solder connection structure 50 in which the total film thickness is approximately 20 µm. (d) of FIG. 13 is a view showing an SEM photograph of a cross-section of the solder connection structure 50 in which the total film thickness is approximately 40 µm. (e) of FIG. 13 is a view showing an SEM photograph of a cross-section of the solder connection structure 50 in which the total film thickness is approximately 80 µm.

(a) of FIG. 14 is a view showing an SEM photograph of a cross-section of the solder connection structure (the Ni film alone) in accordance with Comparative Example 1. (b) of FIG. 14 is a view showing an SEM photograph of a cross-section of the solder connection structure 50 (the Ni film 35+the mixed metal film 40) in which the total film thickness is approximately 15 µm. (c) of FIG. 14 is a view showing an SEM photograph of a cross-section of the solder connection structure 50 in which the total film thickness is approximately 20 µm. (d) of FIG. 14 is a view showing an SEM photograph of a cross-section of the solder connection structure 50 in which the total film thickness is approximately 40 µm. (e) of FIG. 14 is a view showing an SEM photograph of a cross-section of the solder connection structure 50 in which the total film thickness is approximately 80 µm.

The following shows how the respective solder connection structures correspond to the SEM photographs shown in FIGS. 12 through 14.

Total film thickness is 10 µm: (a) of FIG. 12, (a) of FIG. 13, and (a) of FIG. 14
Total film thickness is 15 µm: (b) of FIG. 12, (b) of FIG. 13, and (b) of FIG. 14
Total film thickness is 20 µm: (c) of FIG. 12, (c) of FIG. 13, and (c) of FIG. 14
Total film thickness is 40 µm: (d) of FIG. 12, (d) of FIG. 13, and (d) of FIG. 14
Total film thickness is 80 µm: (e) of FIG. 12, (e) of FIG. 13, and (e) of FIG. 14

Each solder connection structure was subjected to soldering at 270° C. for 15 seconds, and measurement of a tensile strength between a Cu material, which was soldered to the solder connection structure, and the aluminum substrate was conducted five times. An average value of measured results is as follows.

Total film thickness is 10 µm: 70.01 N
Total film thickness is 15 µm: 81.68 N
Total film thickness is 20 µm: 73.44 N
Total film thickness is 40 µm: 29.90 N
Total film thickness is 80 µm: 32.66 N According to the above results, in a case where the total film thickness is 20 µm, the solder connection structure 50 (the Ni film 35+the mixed metal film 40) has a tensile strength higher than that of the solder connection structure (the Ni film alone, the total film thickness is 10 µm) in accordance with Comparative Example 1.

Note here that the Ni layer 35 has a film thickness of approximately 10 µm. Accordingly, the total film thickness in the solder connection structure 50 in accordance with an embodiment of the present invention is more than 10 µm. Then, it is particularly preferable, from a viewpoint of tensile strength, that the total film thickness in the solder connection structure 50 (the Ni film 35+the mixed metal film 40) be more than 10 µm and not more than 20 µm.

Meanwhile, in a case where the total film thickness is not less than 40 µm, the solder connection structure 50 (the Ni film 35+the mixed metal film 40) has a tensile strength lower than that of the solder connection structure (the Ni film alone) in accordance with Comparative Example 1. This is because, in a case where the total film thickness is large, (i) metal particles collide with a film deposited on the aluminum substrate 30, so that internal stress resulting from a gas pressure applied during cold spray is accumulated and (ii) a bonding interface between the metal particles increases, so that peeling occurs more easily at an interface portion between the mixed metal film 40 and the solder material 65. Further, the inventor of the present invention found that in a case where the total film thickness is approximately 30 µm, a tensile strength equivalent to the tensile strength (70.01 N) of the solder connection structure (the Ni film alone, the total film thickness is 10 µm) in accordance with Comparative Example 1 is obtained. As such, it is preferable that the total film thickness in the solder connection structure 50 (the Ni film 35+the mixed metal film 40) be more than 10 µm and not more than 30 µm.

Thus, the total film thickness in the solder connection structure 50 (the Ni film 35+the mixed metal film 40) is preferably more than 10 µm and not more than 30 µm, more preferably more than 10 µm and not more than 20 µm. In a case where the total film thickness in the solder connection structure 50 (the Ni film 35+the mixed metal film 40) is within the above ranges, the solder connection structure 50 can have enhanced solder wettability and high tensile strength.

(Other Point 1)

According to the solder connection structure in accordance with an embodiment of the present invention, instead of the Ni powder, a powder material which contains any of gold (Au), zinc (Zn), silver (Ag), and copper (Cu), or an alloy of two or more kinds of Ni, Au, Zn, Ag, and Cu can be used as the first powder material. Further, according to the solder connection structure in accordance with an embodiment of the present invention, instead of the Sn powder, a powder material which contains an Sn-containing alloy can be used as the second powder material.

Note here that an "alloy" refers to a metallic mixture of a plurality of metallic elements or a metallic mixture of a metallic element and a non-metallic element. An alloy, which can be in various states, is exemplified by, for example, (i) a solid solution in which substances of the alloy are completely melted together, (ii) an eutectic crystal in which metals of the alloy are independent of each other at a crystal level, and (iii) an intermetallic compound in which metals of the alloy are coupled together in respective constant ratios at an atomic level. According to an embodiment of the present invention, examples of a state of an "alloy" include such various states as described above.

Further, an "aluminum substrate", which only needs to be a component or a member that allows a certain function to be carried out, can be generically referred to as an "aluminum base material". For example, the solder connection structure in accordance with an embodiment of the present invention can be used for, for example, a cell tab or a bus bar.

Further, examples of a technique that is generally used to join (connect) dissimilar metals mainly include a screw, soldering, and various welding techniques. Note, however, that corrosion may be caused depending on a material of a metal. For example, an aluminum base material and a copper wire which are screwed to each other may cause galvanization and consequently cause corrosion of the aluminum base material. Further, fixation by welding of an aluminum base material and a metallic material different from the aluminum base material requires a step of, for example, removing an oxide film. This requires much time and cost. In view of such a problem of a conventional technique for joining (connecting) dissimilar metals, cold spray is used for the solder connection structure in accordance with an embodiment of the present invention. This allows the solder connection structure in accordance with an embodiment of the present invention (1) to be wider in range of combination of materials than conventional plating, vapor deposition, and clad techniques, (2) to be partially processed, and (3) to be lower in cost.

(Other Point 2)

As described above, the cold spray method involves forming a film by causing metallic powder to collide with, for example, a substrate at a high speed while the metallic powder is in a solid phase. As a result, metal particles often remain in a metal film. Accordingly, in a case where the metal particles are present in the metal film, it is possible to assume that the metal film has been formed by the cold spray method. Meanwhile, in flame spraying, arc spraying, plasma spraying, or the like, metallic powder is melted and then sprayed onto a substrate. As a result, metal particles rarely remain in a metal film.

Accordingly, a person skilled in the art would be able to tell whether or not a metal film has been formed by the cold spray method, on the basis of a cross-section of the metal film.

(Other Point 3)

It is impossible or impractical that a metal film formed by the cold spray method can be identified directly on the basis of a structure or a characteristic of the metal film.

Firstly, considering that metal materials to be used vary in structure and characteristic resulting from the structure, it is impossible that a metal film formed by the cold spray method can be defined by specific words. Secondly, no words exist that allow a metal film formed by the cold spray method to be defined clearly in terms of structure and characteristics. This is because raw material particles sprayed by the cold spray method undergo plastic deformation so as to lose original shapes of the raw material particles, as a result of colliding with a base material to be treated at a high speed. Thirdly, it is impossible or impractical that a metal film formed by the cold spray method can be identified by certain words through measurement of the metal film and analysis based on the measurement. This is because, in order for an indicator for identifying any characteristic to be discovered through (i) numerous repetitions of difficult operation and measurement and (ii) statistical processing of obtained data, an enormous amount of trials and errors is required, which is very impractical.

The present invention is not limited to the embodiments, but can be altered by a skilled person in the art within the scope of the claims. The present invention also encompasses, in its technical scope, any embodiment derived by combining technical means disclosed in differing embodiments.

This international application claims priority on Japanese Patent Application, Tokugan, No. 2015-252077 filed in Japan on Dec. 24, 2015, the entire contents of which are hereby incorporated by reference.

The descriptions above of specific embodiments of the present invention are presented for illustrative purposes, and are not intended to be comprehensive or restrict the present invention to the above-described embodiments themselves. It would be clear to a person skilled in the art that numerous modifications and changes are possible in light of the descriptions above.

REFERENCE SIGNS LIST

10: base material
30: aluminum substrate (aluminum base material)
35: Ni film
40: mixed metal film
41: Ni powder (first powder material)
42: Sn powder (second powder material)
50: solder connection structure
65: solder material
70: Cu material

The invention claimed is:

1. A solder connection structure to be connected with a member via a solder material, comprising:
   an aluminum base material;
   a nickel (Ni) film provided on the aluminum base material, the nickel (Ni) film being formed by a cold spray method; and
   a mixed metal film provided on the nickel (Ni) film,
   the mixed metal film being formed by the cold spray method with use of a mixed powder material, the mixed powder material being a mixture of (i) a first powder material that contains any of nickel (Ni), gold (Au), zinc (Zn), silver (Ag), and copper (Cu), or an alloy of two or more kinds thereof and (ii) a second powder material that contains tin (Sn) or an Sn-containing alloy, wherein the mixed powder material contains the first powder material in a weight ratio of not less than 80% and not more than 95%.

2. The solder connection structure as set forth in claim 1, wherein a total film thickness of the nickel (Ni) film and the mixed metal film is more than 10 μm and not more than 30 μm.

3. A film forming method for forming a metal film on an aluminum base material, comprising:
   a first film formation step of forming , on the aluminum base material, a nickel (Ni) film by a cold spray method; and
   a second film formation step of forming, on the nickel (Ni) film, a mixed metal film by the cold spray method with use of a mixed powder material, which is a mixture of (i) a first powder material that contains any of nickel (Ni), gold (Au), zinc (Zn), silver (Ag), and copper (Cu), or an alloy of two or more kinds thereof and (ii) a second powder material that contains tin (Sn) or an Sn-containing alloy, wherein the mixed powder material contains the first powder material in a weight ratio of not less than 80% and not more than 95%.

* * * * *